United States Patent [19]

Hattori

[11] Patent Number: 4,645,633
[45] Date of Patent: Feb. 24, 1987

[54] DOUBLE TANK TYPE FAST BREEDER REACTOR

[75] Inventor: Sadao Hattori, Nagoya, Japan

[73] Assignees: Central Research Institute of Electric Power Industry, Toshiba Corporation, Tokyo; Hitachi, Ltd., Kanagawa, both of Japan

[21] Appl. No.: 648,264

[22] Filed: Sep. 7, 1984

[30] Foreign Application Priority Data

Sep. 8, 1983 [JP] Japan ................... 58-167126

[51] Int. Cl.⁴ .................. G21C 15/00; G21D 1/00
[52] U.S. Cl. ............................. 376/179; 376/404; 376/406; 376/402
[58] Field of Search ............. 376/171, 179, 402–406, 376/290

[56] References Cited

U.S. PATENT DOCUMENTS 4,186,049 1/1980 Blum et al. ................. 376/404
4,362,694 12/1982 Kayser ...................... 376/405

FOREIGN PATENT DOCUMENTS

0048672 3/1982 European Pat. Off. .
2535378 2/1977 Fed. Rep. of Germany .
2393405 12/1978 France .
964841 7/1964 United Kingdom ........... 376/404

Primary Examiner—Harvey E. Behrend
Attorney, Agent, or Firm—Antonelli, Terry & Wands

[57] ABSTRACT

A double tank type fast breeder reactor including a reactor vessel, and a tank of a secondary cooling system located outside the reactor vessel. The reactor vessel contains a core and installations of a primary cooling system, and the tank contains circulation pumps of the secondary cooling system and steam generators alternately located in the tank, and a body of sodium serving as a secondary coolant located at outer peripheries of the circulation pumps and steam generators. The tank includes an annular portion defined in the tank between walls of the tank and reactor vessel serving as a path of circulation of the secondary coolant. Each steam generator is small in width and has a shroud surrounding heat transfer tubes defining a narrow annulus between one side wall thereof and the reactor vessel and another narrow annulus between an opposite side wall thereof and the tank, and each circulation pump of the secondary cooling system has a shroud defining a narrow annulus between one side wall thereof and the reactor vessel and another narrow annulus between an opposite side wall thereof and the tank.

4 Claims, 11 Drawing Figures

DOUBLE TANK TYPE FAST BREEDER REACTOR

FIELD OF THE INVENTION

This invention relates to a fast breeder reactor (hereinafter FBR), and more particularly it is concerned with a double tank type FBR suitable for reducing the construction costs of FBRs of the tank type.

DESCRIPTION OF THE PRIOR ART

In a tank type FBR of the prior art, installations of a primary cooling system for directly cooling a core are contained in a reactor vessel together with the core, so that sodium serving as a primary coolant flows in circulation through the reactor vessel. Heat generated in the core is transferred via intermediate heat exchangers located in the reactor vessel to a secondary cooling system, in which the heat is transferred to a secondary coolant via secondary coolant piping to steam generators located outside a containment vessel and then to a generating installation of a turbine.

Figure 1:
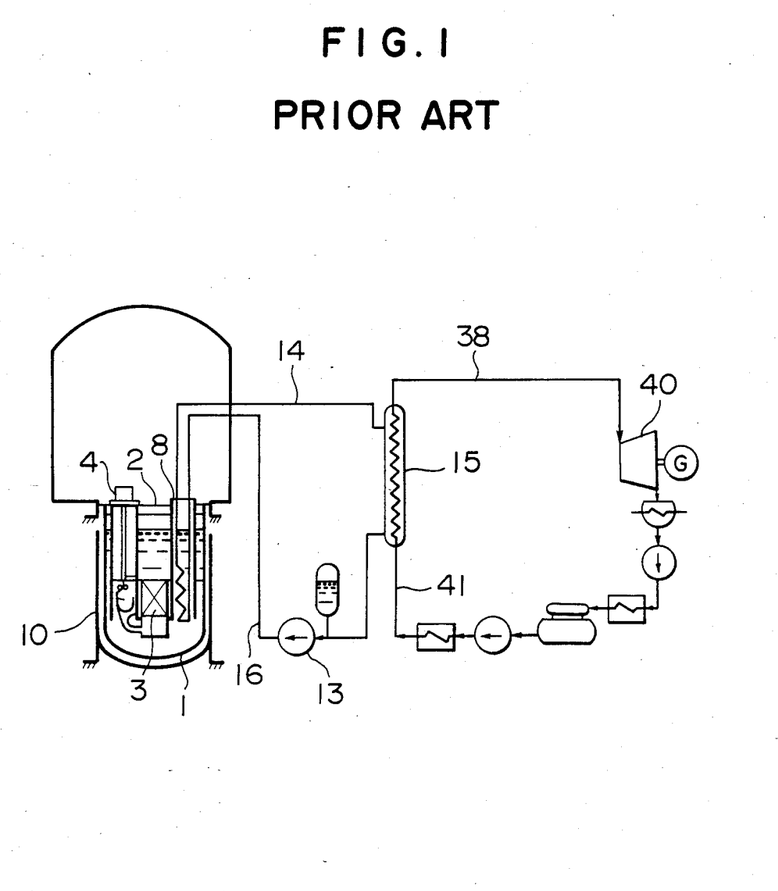
FIG. 1 is a systematic view of a tank type FBR of the prior art.

FIG. 1 shows in a systematic view a tank type FBR of the prior art, in which a reactor vessel 1 has a roof slab 2 at its top and a core 3 substantially in a central portion thereof. Sodium circulated through the reactor vessel 1 by circulation pumps 4 of the primary cooling system cools the core 3 and is then admitted to intermediate heat exchangers 8 where the sodium transfers heat to sodium serving as a secondary coolant which, being circulated by circulation pumps 13 of a secondary cooling system, transfers the heat via hot leg lines 14 to steam generators 15 where heat exchange takes place to generate steam which flows via a main steam line 38 to a turbine 40. 41 is a return line.

Figure 2:
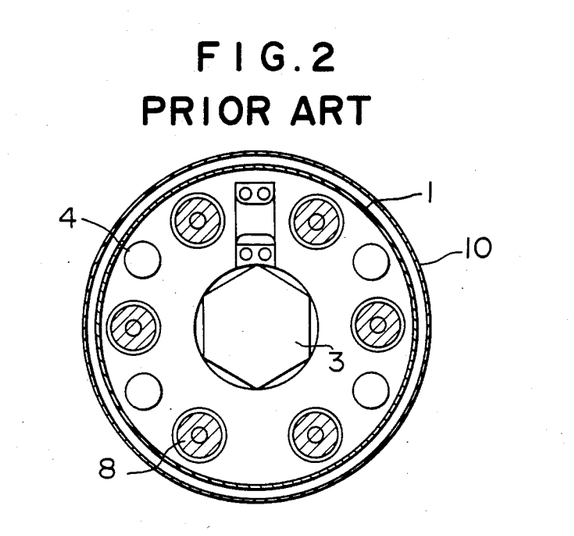
FIG. 2 is a plan view of the reactor vessel of the FBR shown in FIG. 1, showing its construction.
Figure 3:
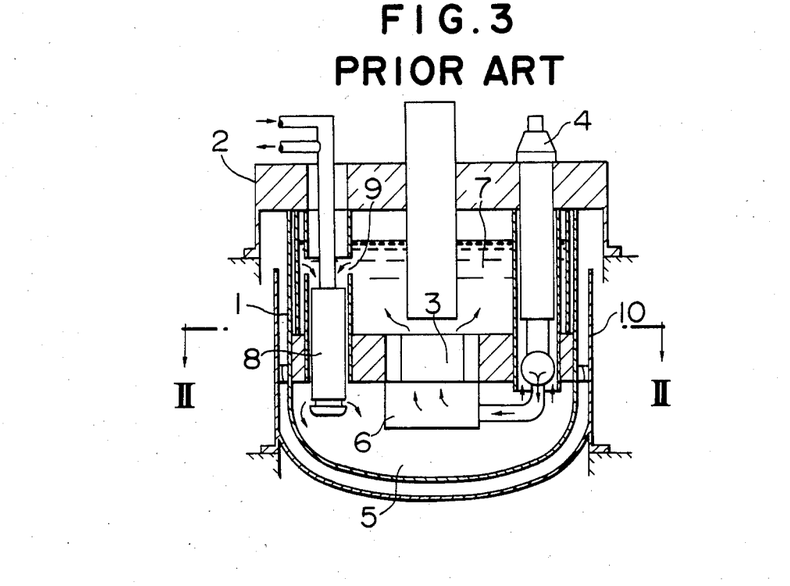
FIG. 3 is a front view of the reactor vessel of the FBR shown in FIG. 1, showing its construction.

FIGS. 2 and 3 are a plan view and a front view, respectively, of the reactor vessel 1 of the tank type FBR shown in FIG. 1. FIG. 2 shows the reactor vessel 1 in a section taken along the line II—II in FIG. 3. It will be seen that the reactor vessel 1 sealed by the roof slab 2 to provide a sealed vessel contains therein a coolant that has been rendered radioactive by a nuclear reaction taking place in the core 3, the circulation pumps 4 of the primary cooling system for forcedly circulating the coolant, and the intermediate heat exchangers 8 in which heat exchange takes place between the radioactive coolant and a secondary coolant 12.

A low temperature coolant in a cold pool 5 is drawn by suction into the circulation pumps 4 suspended from the roof slab 2 and led to a high pressure plenum 6 after being pressurized. Then, the pressurized coolant flows through the core 3 and becomes high in temperature. The coolant of high temperature is admitted to a hot pool 7, from which it is introduced into the intermediate heat exchangers 8 suspended from the roof slab 2 via openings 9 of the intermediate heat exchangers 8 communicating with the hot pool 7. In the intermediate heat exchangers 8, the coolant of high temperature exchanges heat via heat transfer tubes with the secondary coolant 12 flowing in circulation through the steam generators 15 shown in FIG. 1, and the coolant that has become low in temperature is returned to the cold pool 5.

A safety vessel 10 is installed outside the reactor vessel 1 which is prevented from vibrating horizontally by the safety vessel 10 through a stabilizer.

In the tank type FBR of the construction shown and described hereinabove, it is inevitable that the secondary coolant piping for transferring heat from the primary coolant become great in length in view of its arrangement. This gives rise to the problem that the expenses for laying the secondary coolant piping and accessory equipment increase. Also, there is the problem that a large space is required for installing the secondary coolant piping and accessory equipment.

OBJECT OF THE INVENTION

This invention has been developed for the purpose of solving the aforesaid problems of the prior art. Accordingly, the invention has as its object the provision of a double tank type FBR which is capable of greatly reducing the length of the secondary coolant piping and accessory equipment and eliminating the need to provide mechanical stabilizers for preventing the reactor vessel from vibrating horizontally by virtue of the effects achieved by the secondary coolant in the tank in damping horizontal vibrations.

STATEMENT OF THE INVENTION

The outstanding characteristic of the invention enabling the aforesaid object to be accomplished is that there is provided, outside a reactor vessel containing installations of a primary cooling system, a tank of a secondary cooling system containing circulation pumps of the secondary cooling system and steam generators alternately located in the tank outside the reactor vessel, and a body of sodium serving as a secondary coolant located at outer peripheries of the circulation pumps and steam generators, the tank including an annular portion defined in the tank by walls of the tank and reactor vessel serving as a path of circulation of the secondary coolant.

DESCRIPTION OF THE PREFERRED EMBODIMENTS

Preferred embodiments of the invention will now be described in detail by referring to FIGS. 4–11.

Figure 4:
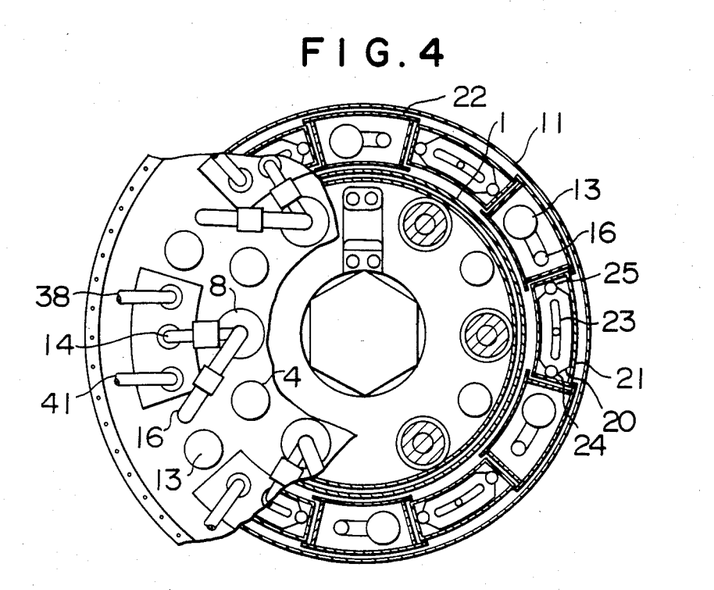
FIG. 4 is a plan view of the double tank type FBR comprising one embodiment of the invention, showing the essential portions in section.
Figure 5:
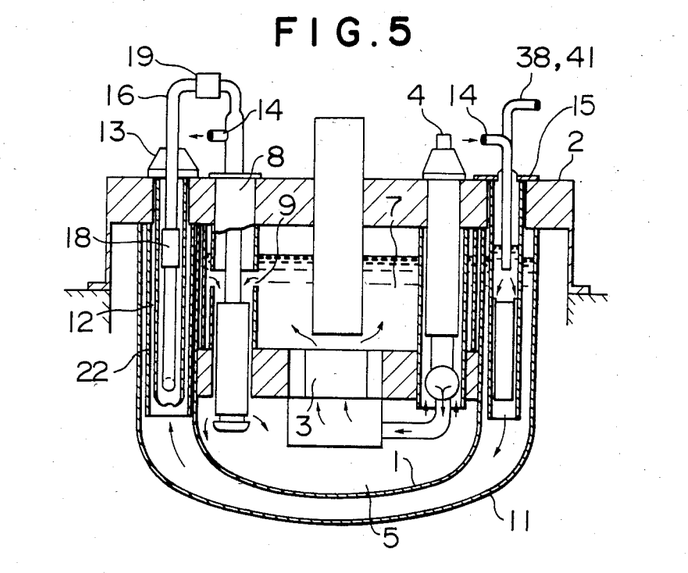
FIG. 5 is a vertical sectional view of the double tank type FBR comprising one embodiment of the invention, shown in FIG. 4.

FIG. 4 is a plan view of one embodiment of the FBR in conformity with the invention, showing the essential portions in section, and FIG. 5 is a front view of the FBR according to the invention shown in FIG. 4. In FIGS. 4 and 5, a tank 11 of the secondary cooling system is located outside the reactor vessel (the tank of the primary cooling system) 1 and suspended from the roof slab 2 like the tank 1 of the primary cooling system. The circulation pumps 13 of the secondary cooling system and the steam generators 15 are located in an annulus between the reactor vessel 1 and the tank 11 of the secondary cooling system, and the sodium 12 serving as a secondary coolant is filled in the annulus so that the circulation pumps 13 of the secondary cooling system and the steam generators 15 are submerged in the sodium 12 while being suspended from the roof slab 2 like the equipment of the primary cooling system. The circulation pumps 13 of the secondary cooling system and the steam generators 15 are equal in number to the intermediate heat exchangers 8, in view of the construction of a secondary coolant flow passage, and alternately arranged in the annulus.

Sodium serving as a primary coolant is heated in the core 3 as is the case with the prior art and drawn by suction into the intermediate heat exchangers 8, from which it is released into the cold pool 5 to be drawn by suction into the circulation pumps 4 of the primary cooling system, to be pressurized and returned to the core 3 in circulation.

As described hereinabove, the circulation pumps 13 of the secondary cooling system and the steam generators 15 are located in the annulus of the double tank. Thus, it is essential that they be constructed such that the diameter of the tank 11 of the secondary cooling system can be minimized and effective use can be made of the space in the annulus. To this end, the steam generators 15 are preferably shaped to expand peripherally of the annulus as viewed from above. The end is attained by constructing a shroud 21 surrounding heat transfer tubes 20 of each steam generator 15 in such a manner that a surface thereof located on the side of the reactor vessel 1 cooperates with the reactor vessel 1 to define therebetween a narrow annulus while a surface thereof located on the side of the tank 11 of the secondary cooling system cooperates with the tank 11 to define therebetween a narrow annulus. A shroud 22 is provided to each circulation pump 13 of the secondary cooling system to define one annulus between an outer wall surface of the reactor vessel 1 and the shroud 22 and another annulus between an inner wall surface of the tank 11 and the shroud 22, as the annuli are defined between the shroud 21 of each steam generator 15 and the reactor vessel 1 and the tank 11 of the secondary cooling system. The pump shroud 22 includes side plates located on the side of the reactor vessel 1 and the tank 11 of the secondary cooling system which are formed with projections extending peripherally in such a manner that they overlap side plates of the adjacent steam generator shroud 21, so as to avoid a flow of the sodium serving as the secondary coolant radially of the double tank through peripheral gaps between the steam generator shroud 21 and pump shroud 22.

Generally, a structure comprising two cylinders one fitted in the other and having a body of liquid in a space defined between their walls has a vibration characteristic such that vibrations of the inner and outer cylinders in the same direction (equal phase mode) is predominant. This means that the tank 11 of the secondary cooling system contributes to the vibrations of the reactor vessel 1 and that if the tank 11 of the secondary cooling system has a rigidity higher than that of the reactor vessel 1, then the vibration of the reactor vessel 1 is damped by the tank 11 of the secondary cooling system through the sodium 12 serving as the secondary coolant.

By providing the steam generators 15 and circulation pumps 13 with the steam generator shrouds 21 and pump shrouds 22 as described hereinabove, the small width annuli are defined between the outer surface of the reactor vessel 1 and the steam generators 15 and circulation pumps 13 of the secondary cooling system and between the inner surface of the tank 11 of the secondary cooling system and the steam generators 15 and circulation pumps 13 of the secondary cooling system respectively through the entire circumference of the double tank. The annuli of small width and the body of the sodium 12 serving as the secondary coolant filled in the annuli of small width have the effect of damping horizontal vibrations of the double tank by the force of liquid of the sodium. Thus, the need to prvide the reactor vessel 1, steam generators 15 and circulation pumps 13 of the secondary cooling system with mechanical stabilizer means for preventing them from vibrating horizontally can be eliminated. Horizontal vibration loads are applied to the tank 11 of the secondary cooling system via a liquid (sodium serving as a secondary coolant). Therefore, it is necessary that the strength of the tank 11 of the secondary cooling system be increased or stabilizers 17 shown in FIG. 9 be attached to an outer wall surface of the tank 11.

The pump shrouds 22 are suspended from the roof slab 2 and remain stationary. The tank 11 of the secondary cooling system which is located outside the reactor vessel 1 and surrounds same serves concurrently as a safety vessel 10 of a tank type FBR of the prior art.

The sodium serving as the secondary coolant flows, as it is drawn by suction from the tank 11 of the secondary cooling system by the circulation pumps 13 of the secondary cooling system, through cold leg lines 16 to an upper portion of the roof slab 2 from which it is introduced into secondary side inlet nozzles of the intermediate heat exchangers 8. Lines connecting the cold leg lines 16 to the secondary side inlet nozzles of the intermediate heat exchanges 8 are connected together via joints 18 and 19, expandable and contractable by means of bellows due to the temperature difference between the parts they connect together, to thereby absorb the difference in thermal expansion between the parts. The sodium introduced into the secondary side of the intermediate heat exchangers receives heat from the primary side thereof and enters the steam generators 15 via the hot leg lines 14 from secondary side outlet nozzles. In each of the steam generators 15, the sodium flows out of a sodium header located in an upper portion of the heat transfer tubes 20 and flows through a flow regulating plate 23 and between the heat transfer tubes 20. While flowing between the heat transfer tubes 20, the sodium exchanges heat with water or steam flowing through the heat transfer tubes 20. After flowing between the heat transfer tubes 20, the sodium is returned to the tank 11 of the secondary cooling system from which it is drawn by suction again by the circulation pumps 13 of the secondary cooling system, to flow constantly in circulation. By virtue of the aforesaid construction, the sodium in contact with wall surfaces of the tank 11 of the secondary cooling system is relatively low in temperature in all the zones, thereby contributing to the soundness of the tank 11 of the secondary cooling system.

In the secondary cooling system, it is only the path of flow of the sodium between the secondary side outlet nozzles of the intermediate heat exchangers 8 and inlet lines of the steam generators and the path of flow of the sodium between the heat transfer tubes 20 in the steam generators 15 that are high in temperature.

Figure 6:
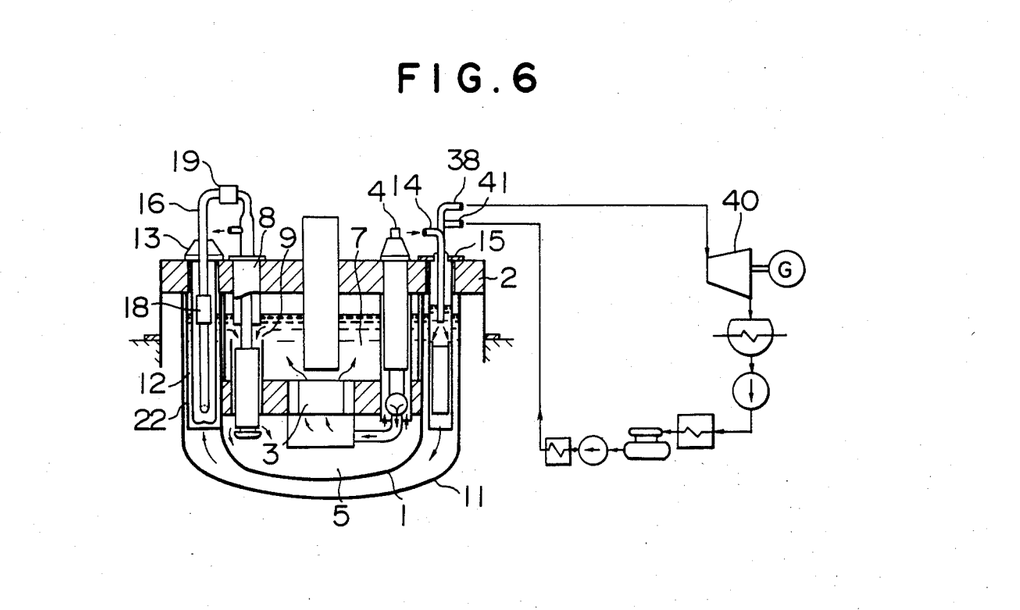
FIG. 6 is a systematic view of the embodiment of the invention shown in FIGS. 4 and 5.

FIG. 6 is a systematic view of the embodiment of the invention shown in FIGS. 4 and 5. It will be seen that the secondary cooling system of the double tank type FBR according to the invention is smaller in length than the secondary cooling system of the prior art because the equipment of the secondary cooling system or the steam generators 15, secondary pumps 13 and cold leg lines 16 are contained in the tank 11 of the secondary cooling system.

Figure 7:
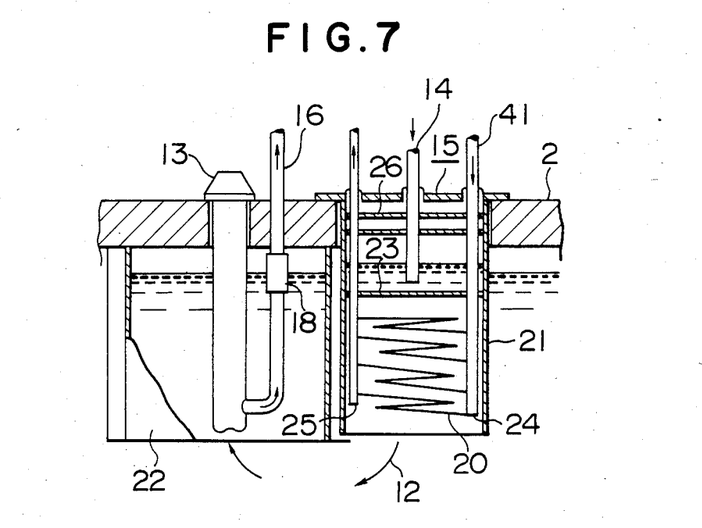
FIG. 7 is a fragmentary front view of the reactor vessel of the double tank type FBR shown in FIGS. 4 and 5, showing the circulation pump of the secondary cooling system and the steam generator in detail.

FIG. 7 is a fragmentary front view of the double tank type FBR according to the invention, showing in detail the circulation pump 13 of the secondary cooling system and the steam generator 15 shown in FIGS. 4 and 5. In all the figures, parts similar to each other are designated by like reference characters. The sodium of high temperature introduced into the steam generator 15 flows through an upper cover and then enters from the header located below the level of the sodium into the path of flow of the sodium outside the heat transfer tubes 20, and it flows through the flow regulating plate 23 and along the serpentine heat transfer tubes 20, so that heat exchange takes place between the sodium and steam flowing in the heat transfer tubes 20 before the sodium is released from the steam generator 15 through its lower portion and returned to the tank 11 of the secondary cooling system. The heat generator 15 is contained in the shroud 21 and suspended from the cover. When necessary, all the steam generators 15 can be withdrawn from the tank 11 of the secondary system.

Water is fed to each of the steam generators 15 from a feedwater nozzle 41 through the upper cover to a feedwater head 24, from which it flows into various heat transfer tubes 20 to effect heat exchanger and be converted into steam, which collects in a steam header 25 before being released through the upper cover and from a steam nozzle. The shroud 21 of each steam generator 15 is formed at a cover gas section thereof with an aperture which is maintained in communication with an upper cover gas of the tank 11 of the secondary cooling system. A thermal shield 26 is provided to an upper portion of the cover gas section, to avoid the temperature of the upper portion and upper cover of the steam generator 15 becoming high.

The arrangement of the equipment in the tank 11 of the secondary cooling system as described hereinabove eliminates the need to provide a line connecting each steam generator 15 to each circulation pump 13 of the secondary cooling system and makes it possible to reduce the lengths of other lines of the secondary cooling system. The use of the double tank type FBR of the aforesaid construction makes it unnecessary to provide the accessory facilities, such as the packing drainage, overflowing system, which has hitherto been necessary in the prior art, and enables the control system for the cover gas of the secondary cooling system to be greatly simplified in construction and arrangement.

The invention makes it possible to reduce the area of the site for building a nuclear reactor and to reduce the volume of concrate necessary for building one, because the installations of the secondary cooling system can be reduced in number of the apparatus of smaller number can be concentrated in their arrangement, as noted hereinabove.

From the point of view of designing a nuclear reactor with an emphasis on coping with elevated temperatures, the invention offers the advantage that design is facilitated because it is only the hot leg lines and the heat transfer tubes of the steam generators which are very short in length that have to be designed in a manner to cope with high temperatures.

The presence of the sodium serving as a secondary coolant in the tank 11 of the secondary cooling system eliminates the need to use mechanical horizontal stabilizers for the reactor vessel 1, because the sodium has the effect of damping vibrations.

Figure 8:
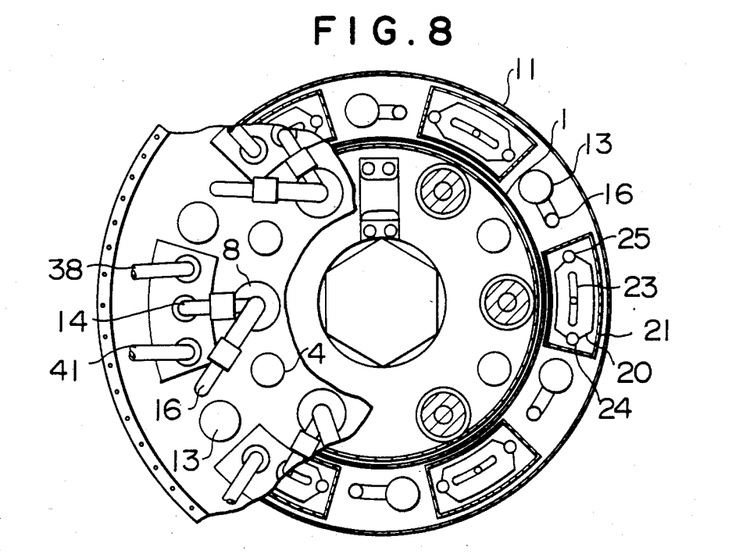
FIG. 8 is a plan view of the double tank type FBR comprising another embodiment, showing the essential portions in section.
Figure 9:
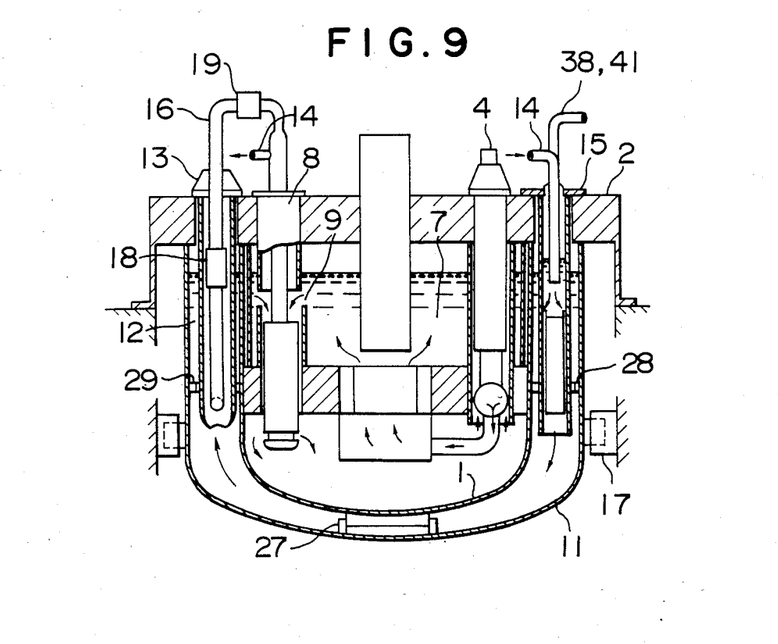
FIG. 9 is a vertical sectional view of the double tank type FBR comprising another embodiment shown in FIG. 8.

FIGS. 8 and 9 are a plan view and a front view of another embodiment which correspond to FIGS. 4 and 5 respectively. In FIG. 8, each pump 13 of the secondary cooling system is not provided with the pump shroud 22. In the embodiment shown in FIGS. 8 and 9, it is only the steam generator shrouds 21 that contribute to damping of vibrations.

As shown in FIG. 9, stabilizers 17 are attached to the tank 11 of the secondary cooling system. In addition, mechanical stabilizers 27, 28 and 29 are attached to the reactor vessel 1, steam generators 15 and circulation pumps 13 of the secondary cooling system, respectively. The embodiment shown in FIGS. 8 and 9 has the increased ability to damp horizontal vibrations by the vibration damping effects achieved by the stabilizers 27, 28 and 29 combined with the vibration damping effects achieved by the sodium 12 serving as a secondary cooling system contained in the tank 11.

Figure 10:
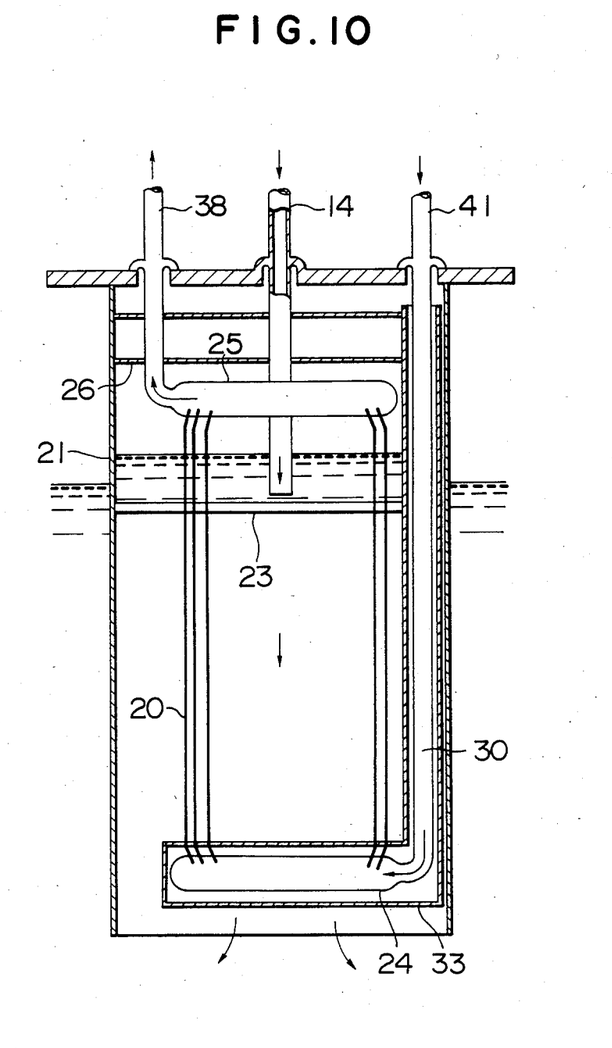
FIGS. 10 and 11 are vertical sectional views of other embodiments.
Figure 11:
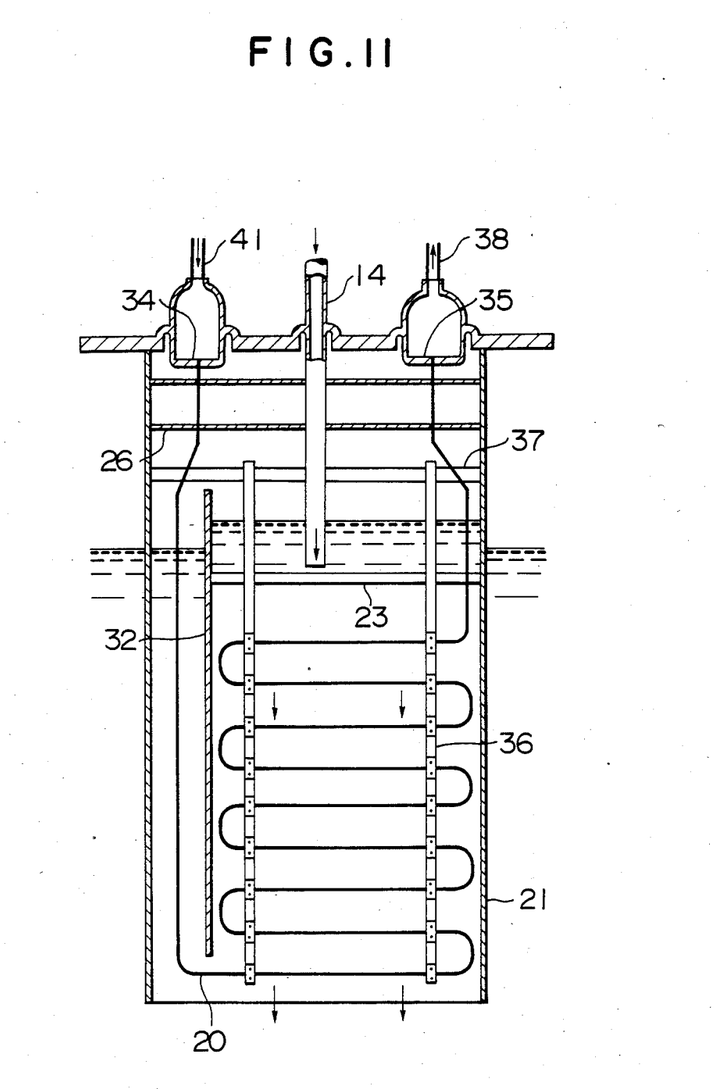

FIGS. 10 and 11 are views showing the constructions of other constructional forms of steam generators 15. In these figures, parts similar to those shown in FIG. 6 are designated by like reference characters. In FIG. 10, the feedwater introduced through a feedwater nozzle into a feedwater pipe 30 flows downwardly therethrough into the feedwater header 24, from which it flows upwardly through the heat transfer tubes 20, to be converted into steam by heat exchange while flowing through the heat transfer tubes 22. The steam thus generated collects in the steam header 25, from which it is released through a steam outlet nozzle. Thermal shield plates 33 are provided to protect the feedwater header 24 and feedwater pipe 30 from heat.

In FIG. 11, the steam generator shown therein has no feedwater header and steam header which are large thickness members, but tube plates are provided to the upper cover section. The feedwater is branched into the heat transfer tube 20 by a feedwater tube plate 34 and flows downwardly outside a wall 32 of a flow path of sodium until it reaches the bottom, where it turns the direction of flow and flows upwardly to perform heat exchange with the sodium, to change into steam which collects in a steam tube plate 35. In this embodiment, the heat transfer tube 20 is in the form of a serpentine tube supported by heat transfer tube support rods 36 which in turn are hung from a suspension member 37.

Effects achieved by the invention are as follows. It is possible to greatly reduce the piping of the secondary cooling system and accessory equipment thereof. The effects achieved by the sodium contained in the tank 11 to serve as a secondary coolant in damping horizontal vibrations make it possible to do without mechanical horizontal stabilizing means for the reactor vessel.

What is claimed is:

1. A double tank type fast breeder reactor comprising:
   a reactor vessel containing a core and installations of a primary cooling system; and
   a tank of a secondary cooling system located outside the reactor vessel containing circulation pumps of the secondary cooling system and steam generators alternately located in the tank, and a body of sodium serving as a secondary coolant located at outer peripheries of the circulation pumps and steam generators; said tank including an annular portion defined in the tank by walls of the tank and reactor vessel serving as a path of circulation of the secondary coolant.

2. A double tank type fast breeder reactor as claimed in claim 1, wherein said circulation pumps of the secondary cooling system and said steam generators are located in an annulus defined between walls of the reactor vessel and the tank.

3. A double tank type fast breeder reactor as claimed in claim 2 wherein each said steam generator is shaped to extend peripherally of the annulus and have a small width and has a shroud surrounding heat transfer tubes defining a narrow annulus between one side thereof and the reactor vessel and another narrow annulus between an opposite side wall thereof and the tank, and wherein each said circulation pump of the secondary cooling system has a shroud defining a narrow annulus between one side wall thereof and the reactor vessel and another narrow annulus between an opposite side wall thereof and the tank.

4. A double tank type fast breeder reactor as claimed in claim 3, wherein the opposite side walls of the shrouds of the steam generators are formed with peripherally extending portions overlapping corresponding side walls of the shrouds of the adjacent circulation pumps of the secondary cooling system whereby a narrow continuous annulus can be defined between the shrouds and the reactor vessel and another continuous narrow shroud can be defined between the shrouds and the tank.

* * * * *